United States Patent
Prevec

(10) Patent No.: US 12,293,388 B1
(45) Date of Patent: May 6, 2025

(54) SHOPPER ASSISTANCE SYSTEM BASED UPON SHOPPER DWELL TIME AND RELATED METHODS

(71) Applicant: Inmar Clearing, Inc., Winston-Salem, NC (US)

(72) Inventor: Joe W. Prevec, Clemmons, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/542,666

(22) Filed: Dec. 16, 2023

(51) Int. Cl.
*G06Q 30/0251* (2023.01)

(52) U.S. Cl.
CPC ..... *G06Q 30/0261* (2013.01); *G06Q 30/0255* (2013.01)

(58) Field of Classification Search
None
See application file for complete search history.

(56) References Cited

U.S. PATENT DOCUMENTS

| | | | |
|---|---|---|---|
| 9,147,212 B2 | 9/2015 | Pettyjohn et al. | |
| 9,202,247 B2 | 12/2015 | Pettyjohn et al. | |
| 9,357,346 B2 | 5/2016 | Jagannath | |
| 9,595,063 B2 | 3/2017 | Pettyjohn et al. | |
| 9,661,467 B2 | 5/2017 | Jagannath | |
| 9,665,881 B1 * | 5/2017 | Ward | G06Q 30/0239 |
| 9,734,524 B2 | 8/2017 | Casey | |
| 10,223,710 B2 | 3/2019 | Purves et al. | |
| 2008/0306756 A1 * | 12/2008 | Sorensen | G06Q 30/0641 705/27.1 |
| 2012/0271715 A1 * | 10/2012 | Morton | G06Q 30/0257 705/14.53 |
| 2016/0071115 A1 * | 3/2016 | Oh | G06Q 20/202 705/7.29 |
| 2016/0189276 A1 * | 6/2016 | Batra | G06Q 30/0633 705/26.8 |
| 2017/0068793 A1 * | 3/2017 | Vargheese | G16H 10/60 |
| 2018/0060911 A1 * | 3/2018 | DeLuca | G06Q 30/0269 |
| 2018/0357309 A1 * | 12/2018 | Eidem | H04L 67/141 |
| 2019/0066140 A1 * | 2/2019 | Mani | G06Q 10/067 |
| 2019/0362381 A1 | 11/2019 | Farshori | |
| 2020/0286135 A1 * | 9/2020 | Matayoshi | G09F 3/204 |
| 2023/0118119 A1 | 4/2023 | Chachek et al. | |
| 2023/0318698 A1 * | 10/2023 | Polizotto | H04W 4/10 370/316 |
| 2024/0193497 A1 * | 6/2024 | Morales Saiki | G06V 40/178 |

* cited by examiner

*Primary Examiner* — Allan J Woodworth, II
(74) *Attorney, Agent, or Firm* — ALLEN, DYER, DOPPELT, + GILCHRIST, P.A.

(57) ABSTRACT

A shopper assistance system may include a mobile device associated with a shopper, and a shopper assistance server. The server may, as the shopper moves along a path of travel within a physical store, cooperate with the mobile device to obtain geographic position data associated with a shopper position within the physical store, and determine a shopper dwell time at a given shopper position within the physical store based upon the geographic position data. The server may also determine a product for purchase adjacent the shopper based upon the given shopper position and cooperate with the mobile device to provide a user interface for providing shopper assistance with the product for purchase based upon the shopper dwell time. The server may also generate and communicate to the mobile device a digital promotion based upon the shopper dwell time.

29 Claims, 17 Drawing Sheets

SHOPPER ASSISTANCE SYSTEM BASED UPON SHOPPER DWELL TIME AND RELATED METHODS

TECHNICAL FIELD

The present invention relates to the field of providing shopper assistance, and, more particularly, to providing shopper assistance based upon a shopper dwell time, and related methods.

BACKGROUND

Sales of a particular product or service may be based upon how well that product or service is marketed to a consumer. One form of marketing or promotion is a coupon, typically in paper form, for a discount toward the product or service. Some coupons may be retailer specific, for example, only redeemable for the discount at a particular retailer, while other coupons may be product specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon, for example, the quantity of a given item, brand of item, size of the product in terms of packaging, and/or the price point of the given item. A typical coupon may also be redeemable only at a given retailer and/or within a threshold time period.

SUMMARY

A shopper assistance system may include a mobile wireless communications device associated with a shopper and a shopper assistance server. The shopper assistance server may be configured to, as the shopper moves along a path of travel within a physical store, cooperate with the mobile wireless communications device to obtain geographic position data associated with a shopper position within the physical store, and determine a shopper dwell time at a given shopper position within the physical store based upon the geographic position data. The shopper assistance server may also be configured to, as the shopper moves along the path of travel within the physical store, determine at least one product for purchase adjacent the shopper based upon the given shopper position and cooperate with the mobile wireless communications device to provide a user interface for providing shopper assistance with the at least one product for purchase based upon the shopper dwell time. The shopper assistance server may be further configured to, as the shopper moves along the path of travel within the physical store, generate and communicate to the mobile wireless communications device a digital promotion based upon the shopper dwell time.

The shopper assistance server may be configured to operate a chatbot via the user interface based upon the shopper dwell time. The shopper assistance server may be configured to operate the chatbot to prompt the shopper to select one of whether the shopper cannot locate the at least one product for purchase, the shopper would like nutrition information associated with the at least one product for purchase, and the shopper would like a recipe associated with the at least one product for purchase, for example.

The shopper assistance server may be configured to generate and communicate the digital promotion to the shopper based upon the shopper dwell time exceeding a threshold elapsed dwell time. The at least one product for purchase may include a plurality of products for purchase, and the shopper assistance server may be configured to, via the user interface, display a portion of a digital sale circular corresponding to at least one discounted product for purchase from among the plurality of products for purchase adjacent the shopper, for example.

The shopper assistance system may further include a plurality of short-range wireless communications devices spaced about the physical store. The shopper assistance server may be configured to obtain geographic position data based upon the plurality of short-range wireless communications devices, for example.

The shopper assistance server may be configured to store a plurality of historical shopper dwell times and store historical geographic position data associated with the shopper. The shopper assistance server may further be configured to predict a shopper path of travel based upon the plurality of historical shopper dwell times and historical geographic position data and generate the digital promotion based upon the predicted shopper path of travel, for example. The shopper assistance server may be configured to operate a machine learning algorithm to predict the shopper path of travel, for example.

The shopper assistance server may be configured to generate the digital promotion to be redeemable toward the at least one product for purchase adjacent the shopper. The digital promotion may have a redeemable value associated therewith, and the shopper assistance server may be configured to set the redeemable value based upon the shopper dwell time, for example. The shopper assistance server may be configured to store historical product purchase data for the shopper and generate the digital promotion based upon the historical product purchase data.

A method aspect is directed to a method of assisting a shopper. The method may include using a shopper assistance server to, as a shopper moves along a path of travel within a physical store, cooperate with a mobile wireless communications device associated with the shopper to obtain geographic position data associated with a shopper position within the physical store, and determine a shopper dwell time at a given shopper position within the physical store based upon the geographic position data. The method may further include using the shopper assistance server to, as the shopper moves along the path of travel within the physical store, determine at least one product for purchase adjacent the shopper based upon the given shopper position, and cooperate with the mobile wireless communications device to provide a user interface for providing shopper assistance with the at least one product for purchase based upon the shopper dwell time. The method may further include using the shopper assistance server to, as the shopper moves along the path of travel within the physical store, generate and communicate to the mobile wireless communications device a digital promotion based upon the shopper dwell time.

A computer readable medium aspect is directed to a non-transitory computer readable medium that includes computer executable instructions that when executed by a processor cause the processor to perform operations. The operations may include, as a shopper moves along a path of travel within a physical store, cooperating with a mobile wireless communications device associated with the shopper to obtain geographic position data associated with a shopper position within the physical store and determining a shopper dwell time at a given shopper position within the physical store based upon the geographic position data. The operations may also include, as the shopper moves along the path of travel within the physical store, determining at least one product for purchase adjacent the shopper based upon the given shopper position and cooperating with the mobile wireless communications device to provide a user interface for providing shopper assistance with the at least one product for purchase based upon the shopper dwell time. The operations further include, as the shopper moves along the path of travel within the physical store, generating and communicating to the mobile wireless communications device a digital promotion based upon the shopper dwell time.

DETAILED DESCRIPTION

Figure 1:
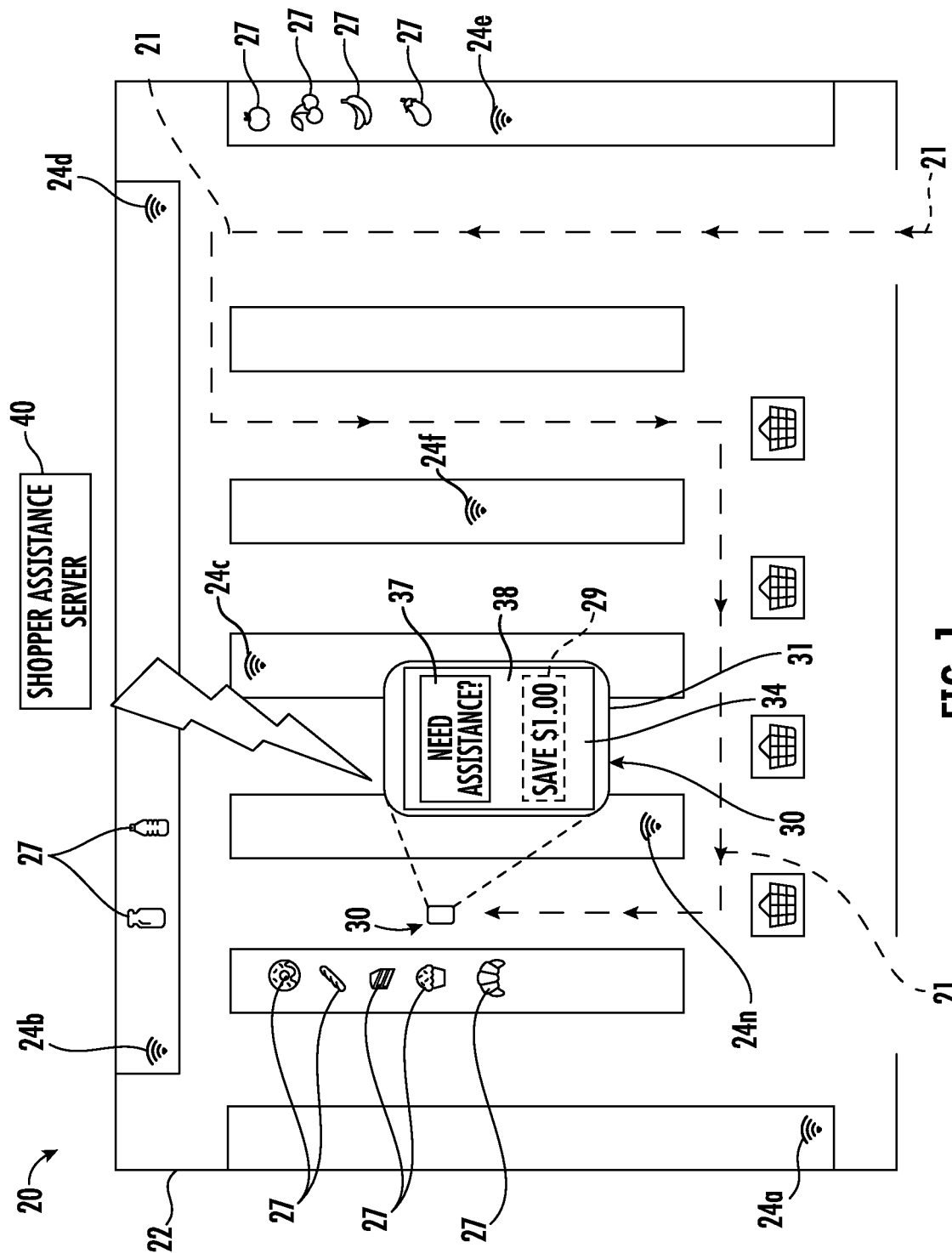
FIG. 1 is a schematic diagram of a shopper assistance system in accordance with an embodiment.
Figure 2:
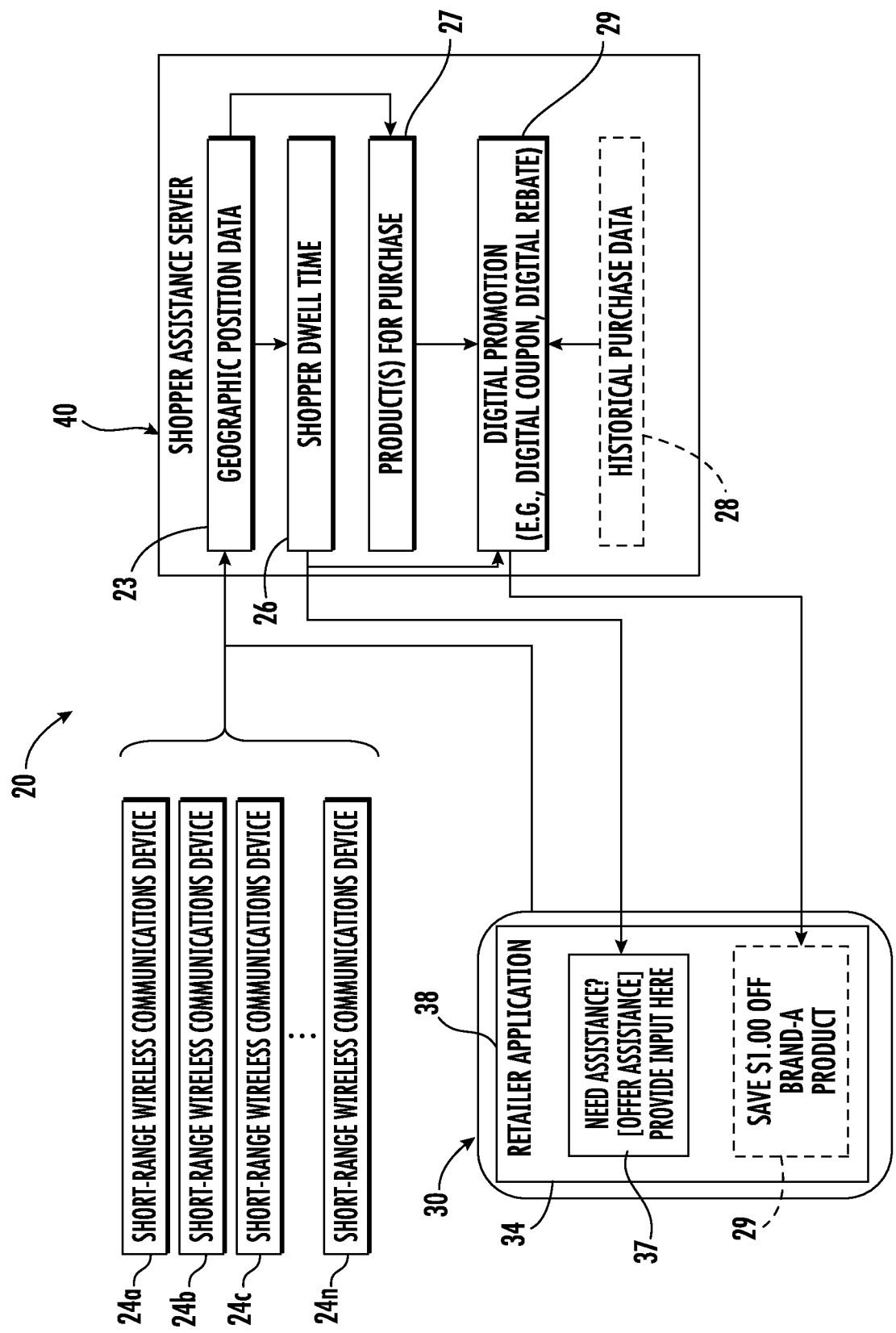
FIG. 2 is a schematic operational block diagram of the shopper assistance system of FIG. 1.
Figure 3:
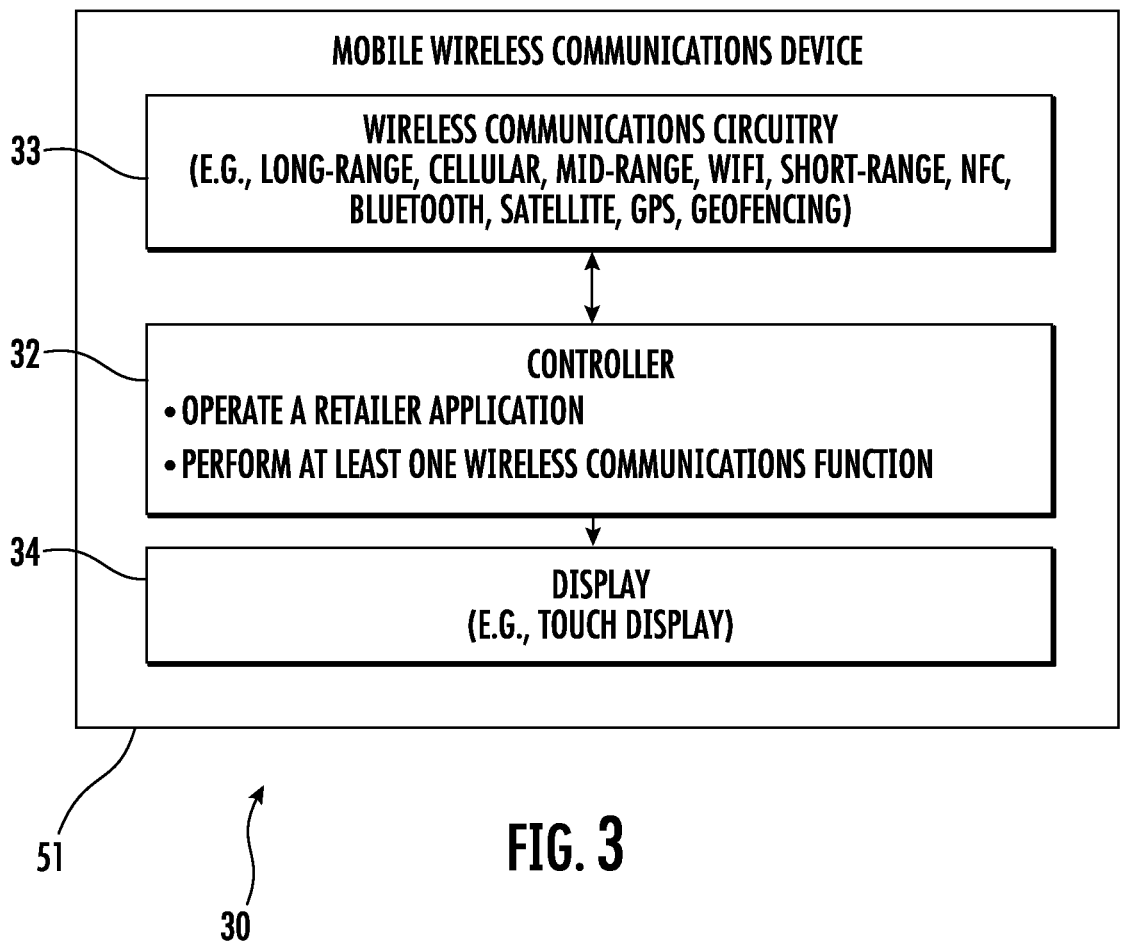
FIG. 3 is a schematic block diagram of the mobile wireless communications device of the shopper assistance system of FIG. 1.
Figure 4:
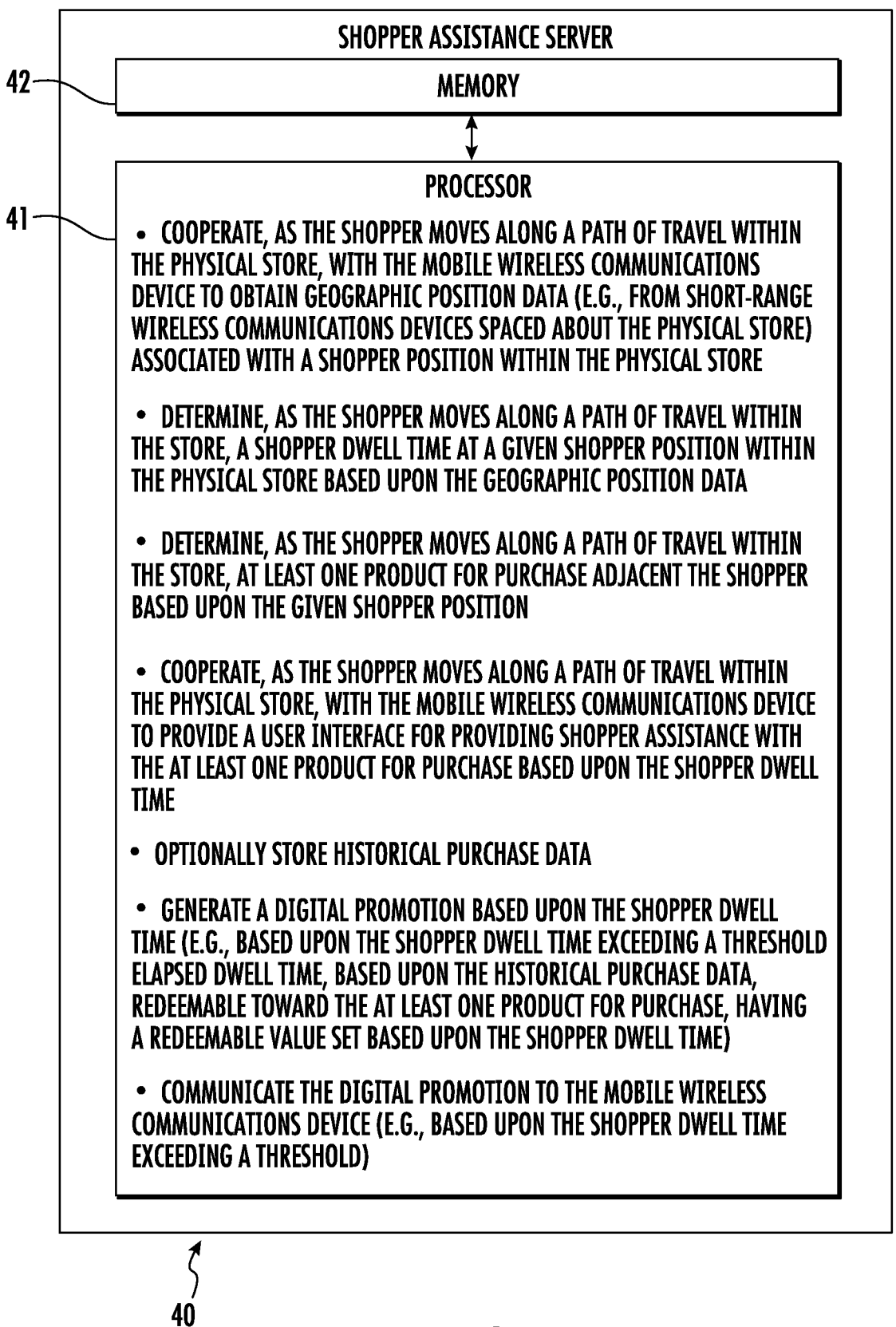
FIG. 4 is a schematic block diagram of the shopper assistance server of the shopper assistance system of FIG. 1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to indicate similar elements in alternative embodiments.

Referring initially to FIGS. 1-4, a shopper assistance system 20 illustratively includes a mobile wireless communications device 30 associated with a shopper. The mobile wireless communications device 30 is illustratively in the form of a mobile phone or smartphone, and includes a portable housing 31 carrying a controller 32. Wireless communications circuitry 33 is coupled to the controller 32. The wireless communications circuitry 33 may include long-range wireless communications circuitry, for example, cellular or satellite (e.g., GPS) communications circuitry. The wireless communications circuitry 33 may include mid-range wireless communications circuitry (e.g., WiFi, beacon technology), and/or short-range wireless communications circuitry (e.g., Bluetooth, NFC, beacon technology). Of course, the wireless communications circuitry 33 may include other and/or additional wireless communications circuitry, for example, to support other and/or additional wireless communications protocols, and/or provide a geofencing function.

The mobile wireless communications device 30 may also include a display 34 coupled to the controller 32. The display 34 may be in the form of a touch-screen display, for example, to accept user input thereto. While the mobile wireless communications device 30 has been described as in the form of mobile phone, those skilled in the art will appreciate that the mobile wireless communications device may be another type of mobile device, for example, a tablet computer, a personal computer, a laptop computer, or wearable computer.

The shopper assistance system 20 also includes a shopper assistance server 40. The shopper assistance server 40 includes a processor 41 and an associated memory 42. While operations of the shopper assistance server 40 are described herein, those skilled in the art will appreciate that the processor 41 and memory 42 cooperate to perform the operations.

The mobile wireless communications device 30 may operate a retailer application 38 or application associated with one or more physical stores 22. The retailer application 38 may operate based upon an application programming interface (API) plugin, for example, to a retailer mobile e-commerce platform, inventory warehouse management system (WMS), loyalty shopper customer relationship management (CRM), planogram, and/or POS historical purchase history, that makes API function calls to the shopper assistance server 40. The retailer application 38 may operate a user interface 37 within the retailer application that performs shopper interface operations. For example, the retailer application 38 may cooperate to display a virtual three-dimensional (3D) store and aisle layout to assist the shopper in navigating the physical store 22. The retailer application 38 may provide product list functions and multimedia content regarding products for purchase 27. The retailer application 38 may also provide a most efficient path of travel through the physical store 22 based upon the product list for the shopper.

The retailer application 38 may also operate to function as a product identifier reader (e.g., barcode or machine readable code reader) to permit price checking or to obtain other product information, such as, for example, stock status, as will be appreciated by those skilled in the art. In an exemplary implementation, a visual indicator (e.g., a red "X" or green "O") may be displayed on the display 34 upon scanning a product for purchase 27 based upon whether the scanned product for purchase meets certain dietary constraints set by the shopper, for example, within the retailer application 38.

Figure 5:
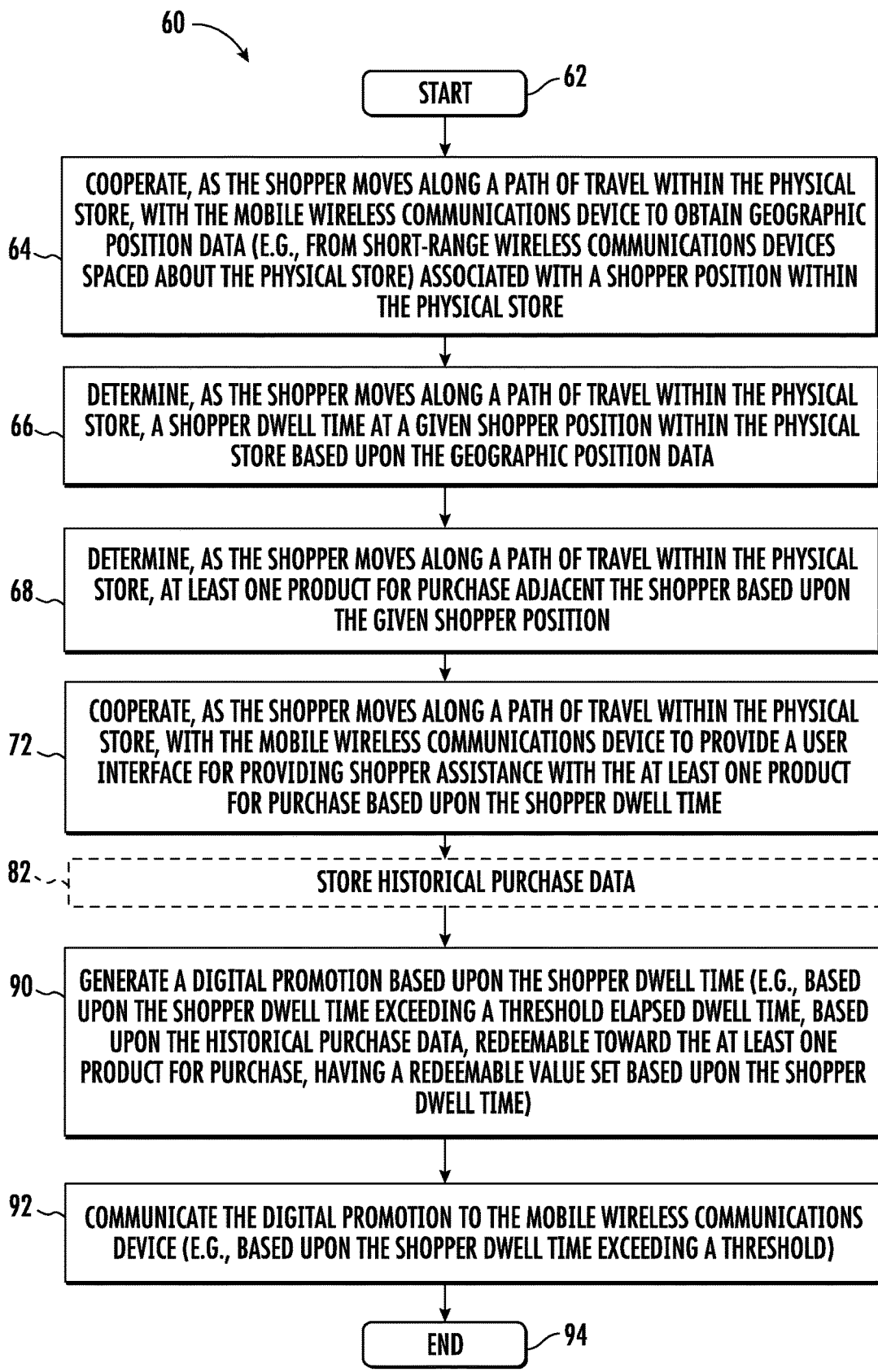
FIG. 5 is a flow chart illustrating operation of the shopper assistance server of the shopper assistance system of FIG. 1.
Figure 6:
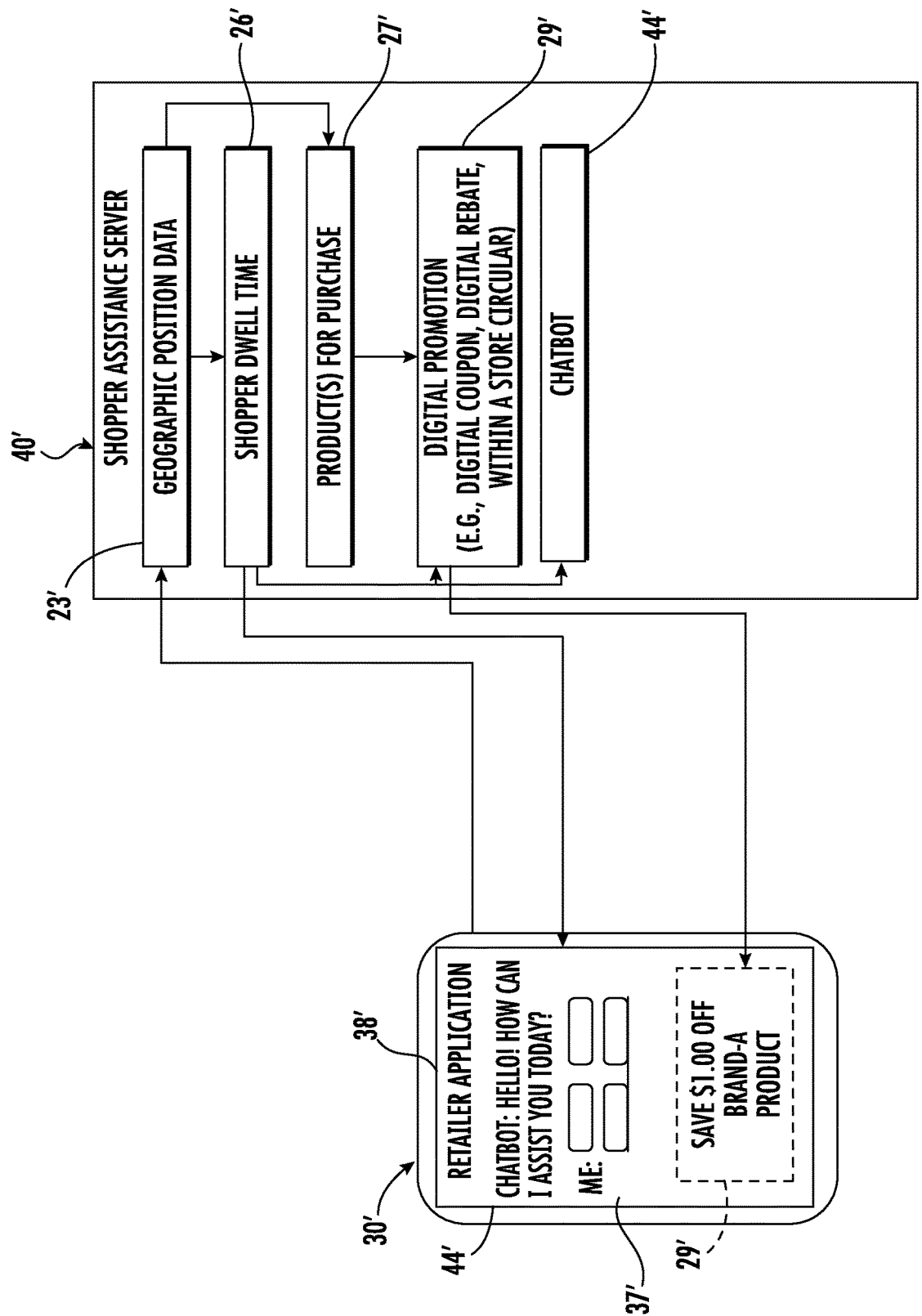
FIG. 6 is a schematic diagram of a shopper assistance system in accordance with another embodiment.
Figure 7:
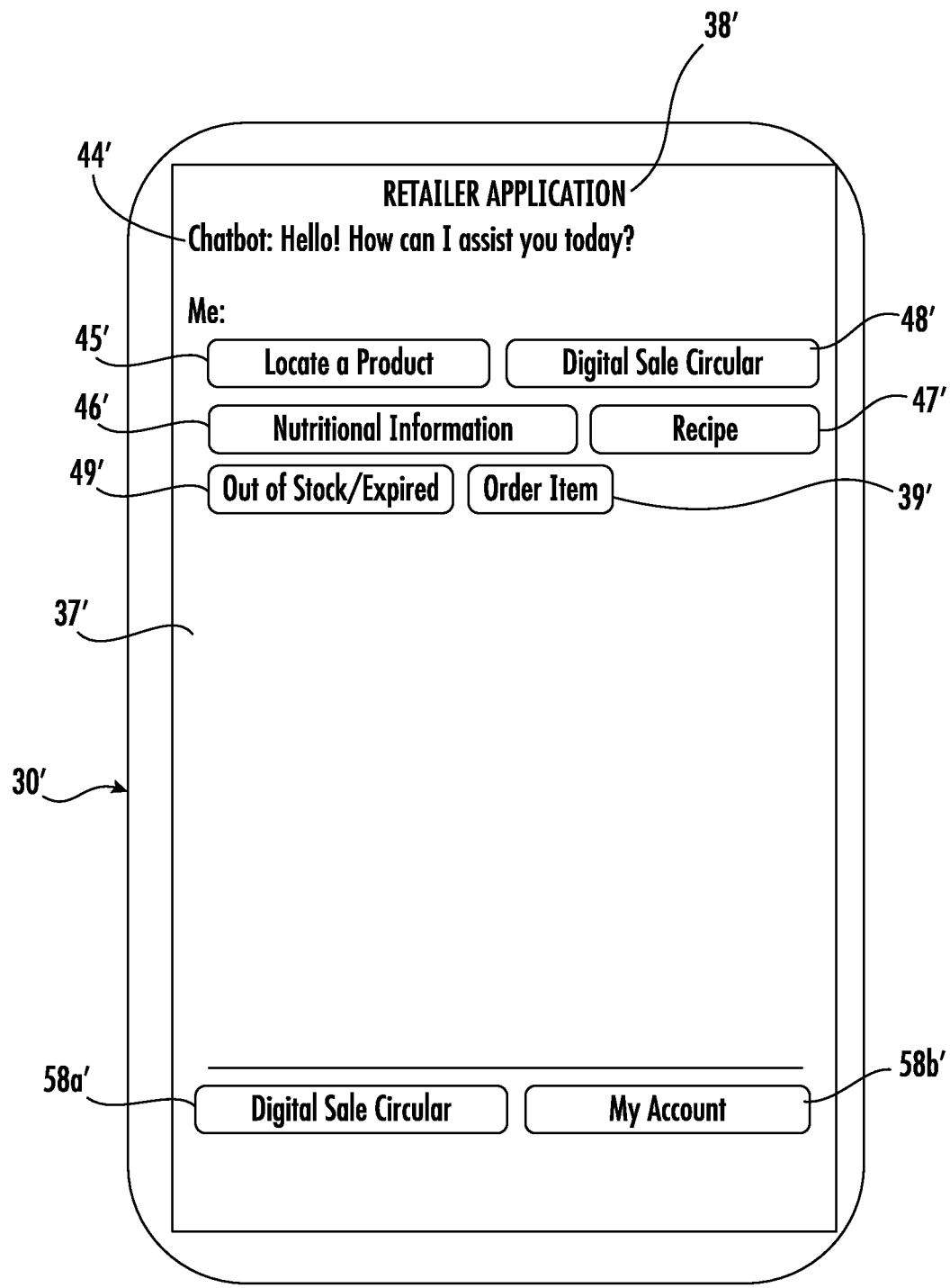
FIG. 7 is a diagram of exemplary operation of a user interface of a mobile wireless communications device in accordance with the embodiment in FIG. 6.
Figure 8:
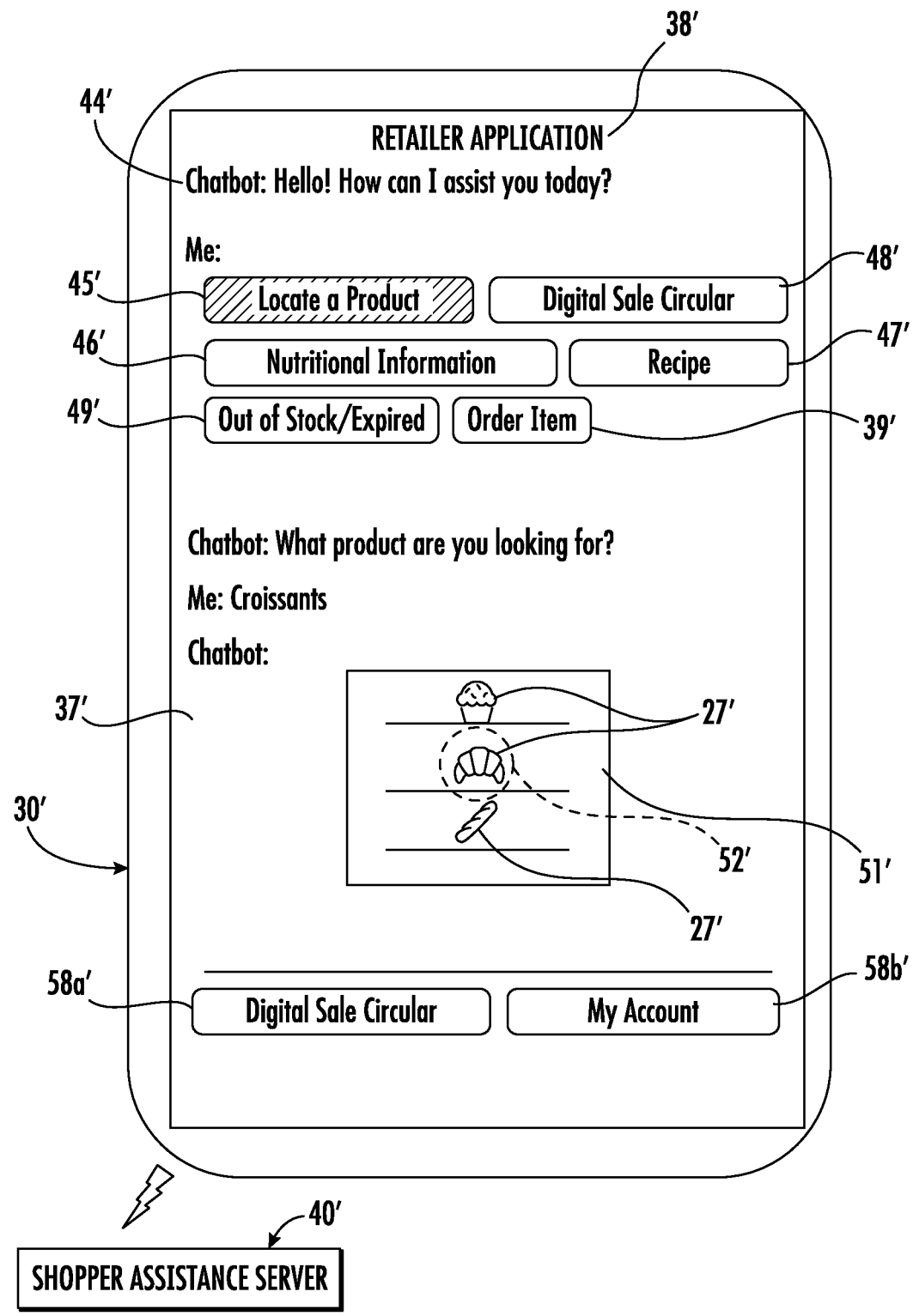
FIG. 8 is another diagram of exemplary operation of the user interface of a mobile wireless communications device in accordance with the embodiment in FIG. 6.
Figure 9:
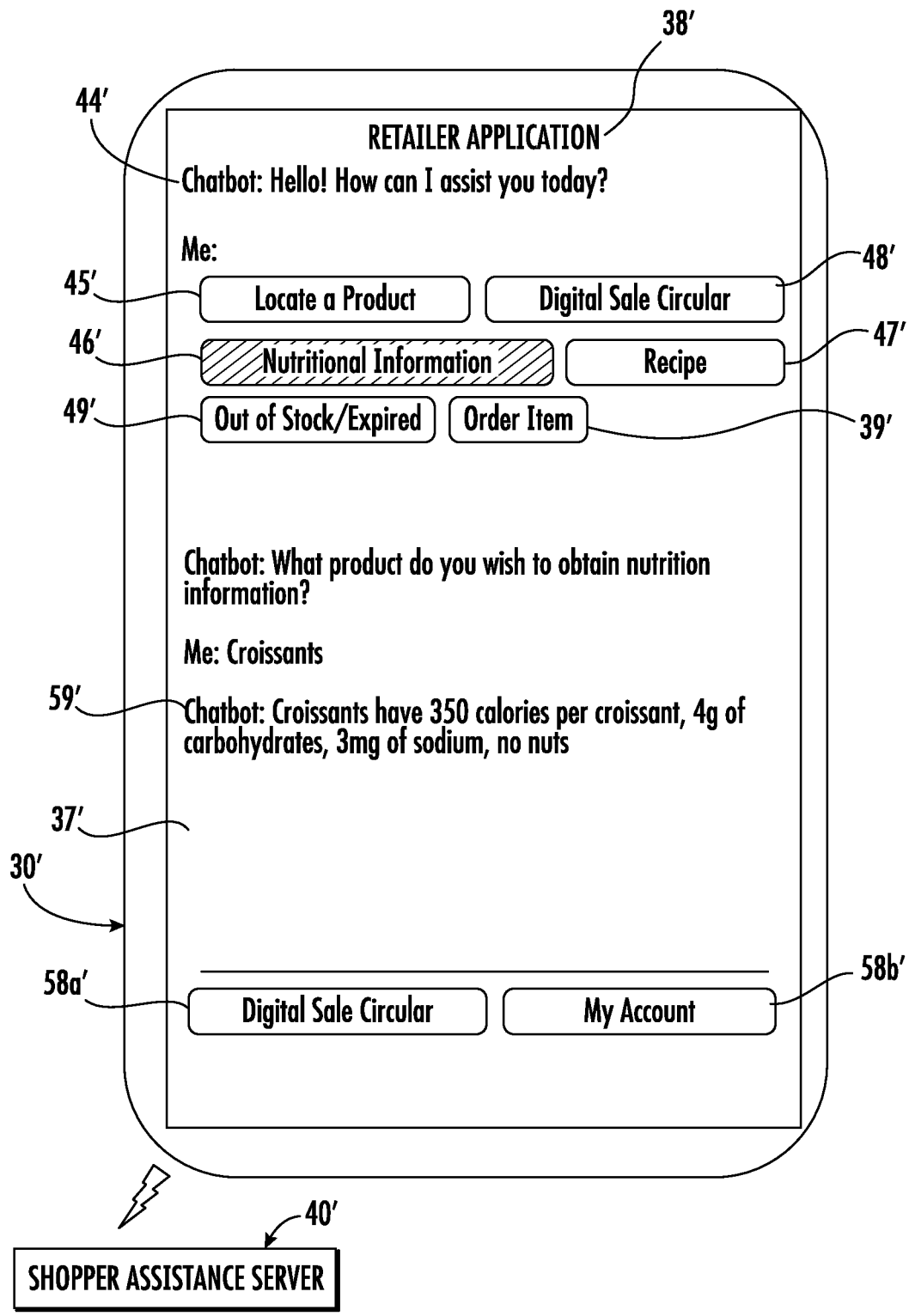
FIG. 9 is another diagram of exemplary operation of the user interface of a mobile wireless communications device in accordance with the embodiment in FIG. 6.
Figure 10:
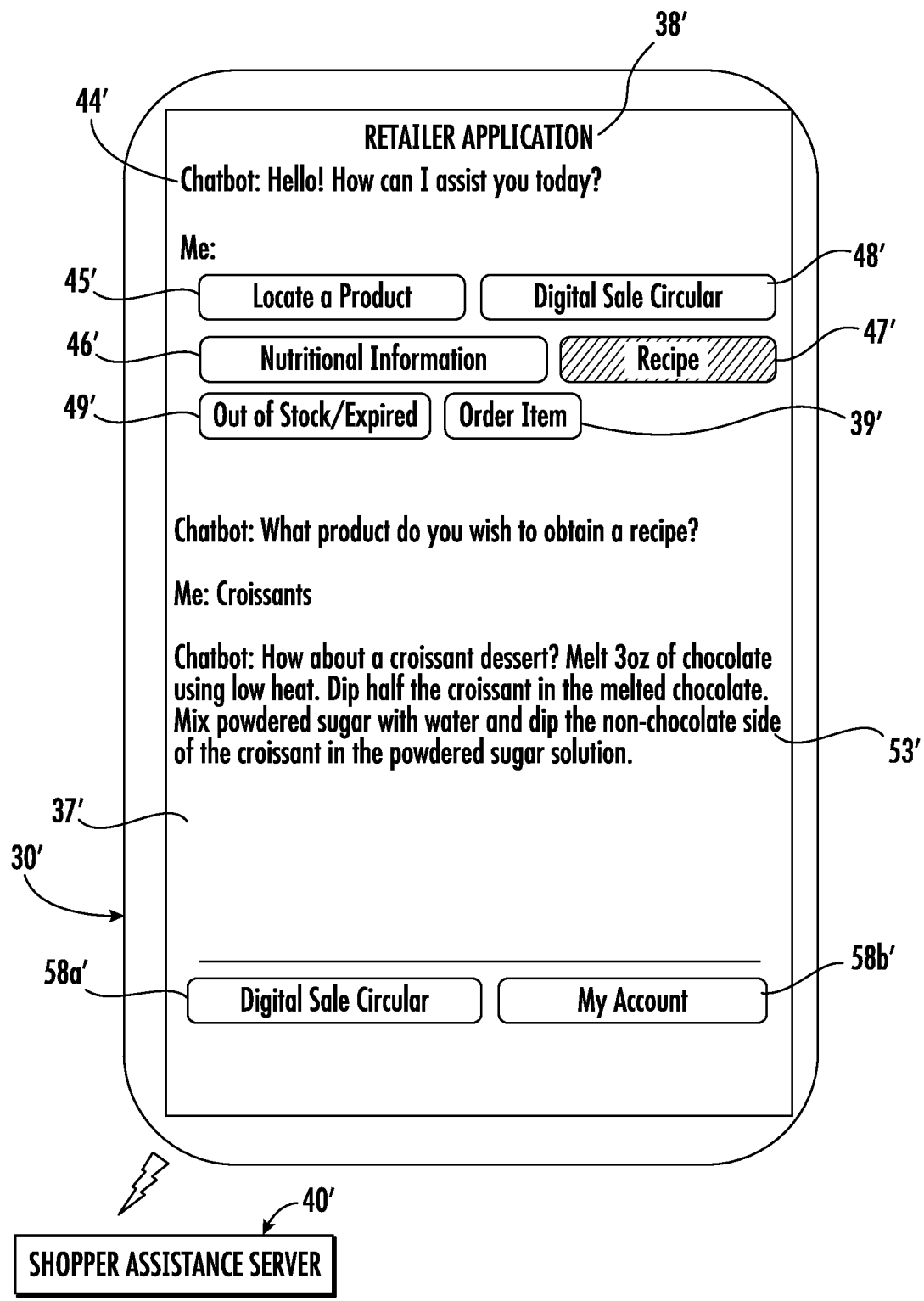
FIG. 10 is another diagram of exemplary operation of the user interface of a mobile wireless communications device in accordance with the embodiment in FIG. 6.
Figure 11:
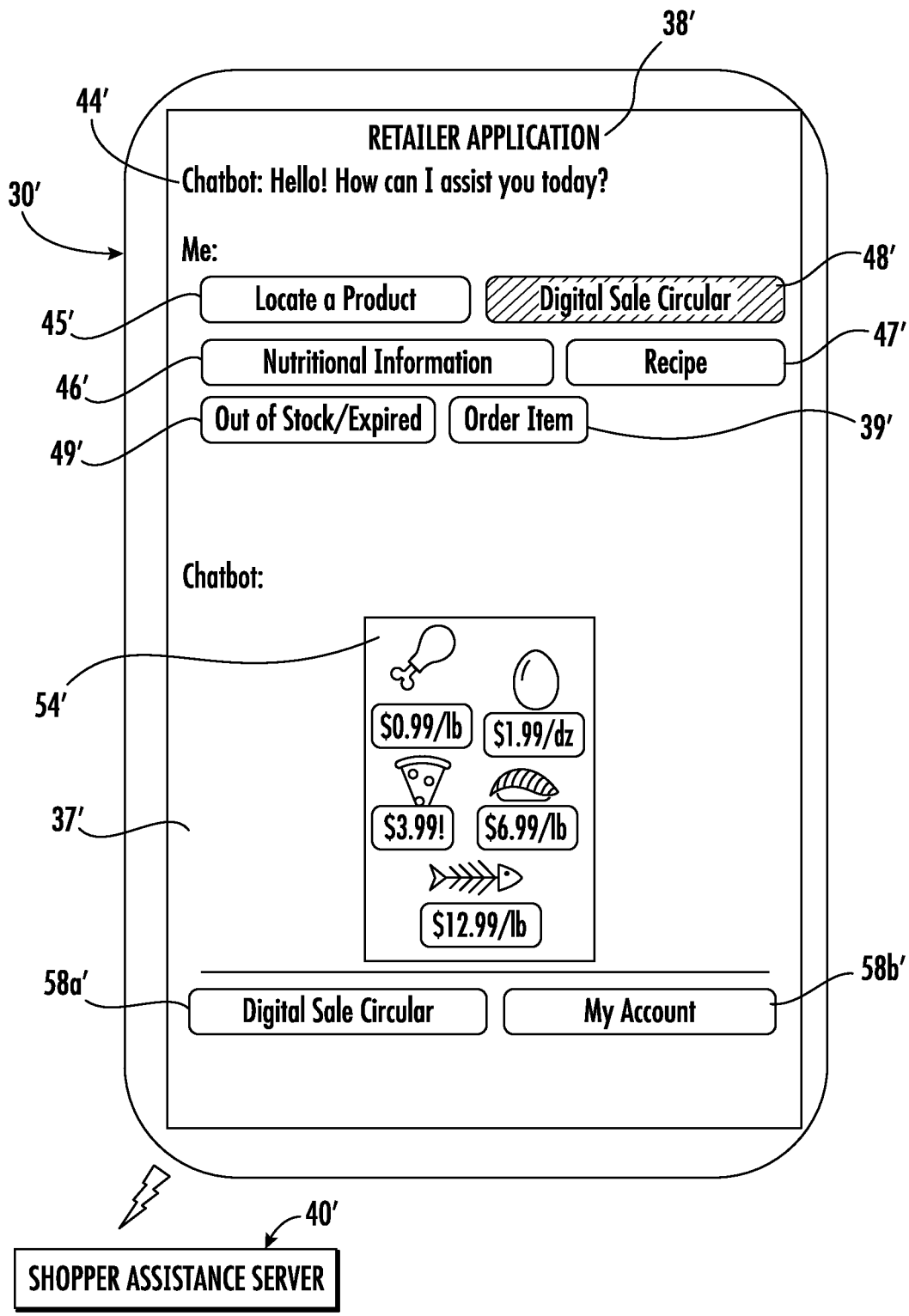
FIG. 11 is another diagram of exemplary operation of the user interface of a mobile wireless communications device in accordance with the embodiment in FIG. 6.

Referring now to the flowchart 60 in FIG. 5, beginning at Block 62, operations of the shopper assistance server 40 will now be described. The operations of the shopper assistance server 40 are performed as the shopper moves along a path of travel 21 within the physical store 22. At Block 64, as the shopper moves along the path of travel 21, the shopper assistance server 40 cooperates with the mobile wireless communications device 30 to obtain geographic position data 23 associated with the physical store 22. More particularly, the mobile wireless communications device 30 may communicate geographic position data 23 representative of its geographic location within the store, for example, relative to aisles, departments, and/or products for purchase, to the shopper assistance server 40. The geographic position data 23 may be relative to a global coordinate system (e.g., GPS), and may be received based upon a global positioning system (GPS) receiver, for example, when the wireless communications circuitry 33 include a GPS receiver. The geographic position data 23 may include relative position data, for example, a position relative to communications access points, for example, WiFi access points, cellular communications towers, etc., such that the mobile wireless communications device may apply geolocation techniques to determine its geographic position within the physical store 22. The geographic position data 23 may include data representative of the geographic position of the mobile wireless communications device and/or raw location data such that the shopper assistance server 40 applies geolocation techniques to determine the shopper position within the physical store 22.

In some embodiments, the shopper assistance system 20 may include short-range wireless communications devices 24a-24n spaced about the physical store 22. The short-range wireless communications devices 24a-24n may be Bluetooth short-range beacons, for example, at known locations or positions within the physical store 22. The mobile wireless communications device 30 may communicate with ones of the short-range wireless communications devices 24a-24n to obtain the geographic position data 23. For example, the given shopper position within the physical store 22 may be based upon a determined signal strength with adjacent ones of the short-range wireless communications devices 24a-24n. In some embodiments, the short-range wireless communications devices 24a-24n may communicate with the shopper assistance server 40 (e.g., communicate geographic position data 23) either independently from or in conjunction with the mobile wireless communications device 30. For example, geographic position data 23 may be communicated to the shopper assistance server 40 from both the mobile wireless communications device 30 and the short-range wireless communications devices 24a-24n, and the shopper assistance server may compare the geographic position data, for example, to obtain a more accurate shopper position within the physical store 22.

The mobile wireless communications device 40 and/or short-range wireless communications devices 24a-24n may communicate, for example, geographic position data 23, periodically or in real or near-real time, and/or based upon movement of the mobile wireless communications device 30 (e.g., orientation and movement as determined by one or more accelerometers carried by the mobile device housing 31) as the shopper moves along the path of travel 21 within the physical store 22. In some embodiments, the rate at which geographic position data 23 is communicated may increase when the shopper is determined to be inside of the physical store 22 and/or shopping within the physical store, for example, as determined by movement or handling of the mobile wireless communications device 30. The determination techniques of the shopper location may be changeable, for example, based upon the determined shopper location. For example, the mobile wireless communications device 30, the shopper assistance server 40, and the short-range wireless communications devices 24a-24n may cooperate so that the geographic position data 23 is based upon GPS data outside of the physical store 22, and becomes based upon WiFi, communications with the short-range communications devices, or other interior geolocation techniques upon the shopper entering the physical store. More particularly, a loss or degradation in GPS signal may be used to switch to another geolocation technique.

The shopper assistance server 40, at Block 66, determines a shopper dwell time 26 at the given shopper position within the physical store 22 based upon the geographic position data 23. More particularly, the shopper assistance server 40, when the geographic position data 23 is not indicative of the shopper moving along the path of travel, operates a timer to measure an amount of time that the shopper has been stationary. The shopper may be stationary or not moving along the path of travel 21, for example, when selecting a product for purchase from a shelf or display, reading product information, browsing for product, searching for a product, and/or locating sale and/or pricing information.

The shopper assistance server 40 determines one or more products for purchase 27 adjacent the shopper based upon the given shopper position (Block 68). The shopper assistance server 40 may determine the products for purchase 27 based upon comparing the given shopper position to known positions within the physical store 21 associated with each of the products for purchase. Accordingly, the shopper assistance server 40 may determine that the shopper has been standing in front of the fresh bread in the bakery for any given amount of time.

The shopper assistance server 40 may store product and dwell times, such that over the course of a shopping trip within the physical store 22, it may be determined that this given shopper spends more time in the vegetable and bakery sections, and more particularly, adjacent the lettuce and fresh bread. Thus, the shopper assistance server 40 may, for a given shopper, store historical path of travel data, dwell times, and adjacent products, for example, to build a shopper profile. The shopper profile may be used by the shopper assistance server 40 for targeting information, promotions, or other data to the given shopper, as will be appreciated by those skilled in the art.

The shopper assistance server 40 cooperates, at Block 72, with the mobile wireless communications device 30 to provide a user interface 37 for providing shopper assistance with the product for purchase based upon the shopper dwell time. The user interface 37 may provide, by way of the display 34, information related to the products for purchase, the physical store 22, promotions, and recipes, for example. Other and/or additional information may be provided via the user interface 37. Of course, user input may be accepted via the user interface 37, for example. In an exemplary implementation, when the shopper is determined to be adjacent a product for purchase for more than a threshold time period based (i.e., the shopper dwell time exceeds a dwell time threshold), the shopper assistance server 40 may prompt the shopper, via the user interface 37, for assistance. Further details of the user interface 37 will be described below.

The shopper assistance server 40 may optionally store historical purchase data 28 for the shopper (Block 82). The historical purchase data 28 may include previous purchase information, for example, product identifiers (e.g., SKU, PLU, UPC), product descriptions, quantities, date and time, physical store location, and whether a promotion or promotions were applied. The historical purchase data 28 may be obtained from point-of-sale (POS) devices, for example, as products are being purchased, scanned at the POS device, or scanned to the shopping cart/shopping basket. In other words, as products are being purchased at POS devices, the historical purchase data 28 is being updated.

The shopper assistance server 40, at Block 90, generates a digital promotion 29 based upon the shopper dwell time 26. For example, the shopper assistance server 40 may generate the digital promotion 29 for an adjacent product for purchase 27 when the shopper dwell time 26 exceeds a promotion threshold corresponding to an elapsed dwell time. The promotion threshold may be set to the same time threshold as the one described above with respect to the providing the user interface 37. Of course, the promotion threshold may be different, for example, longer, than the interface for providing the user interface.

The digital promotion 29 may be generated for a specific brand of product for purchase adjacent the shopper. More particularly, the shopper assistance server 40 may generate the digital promotion 29 based upon the historical product purchase data 28. For example, if the shopper typically purchases Brand-A products, the digital promotion 29 may be redeemable toward Brand-A products. Alternatively, the digital promotion 29 may be redeemable toward Brand-B products, for example, in an attempt to entice the shopper to try another brand of products. Other aspects of the historical product purchase data 28 may be used as a basis for generating the digital promotion 29, for example, product variations (e.g., flavor, size).

The digital promotion 29 may be in the form of a digital coupon, for example, having a redeemable value for a dollar amount off or percent discount off the purchase price of the product for purchase. The digital promotion 29 may, alternatively, be in the form of a digital rebate.

In an embodiment, the shopper assistance server 40 may set the redeemable value based upon the shopper dwell time. For example, the shopper assistance server 40 may set the redeemable value such that a higher shopper dwell time corresponds to a higher redeemable value.

At Block 92, the shopper assistance server 40 communicates the digital promotion 29 to the mobile wireless communications device 30, for example, for display on the user interface 37. The shopper assistance server 40 may communicate the digital promotion 29 based upon detected shopper movement along the path of travel 21 after generating the digital promotion, for example. In an embodiment, the digital promotion 29 may be communicated upon generation thereof, but without displaying the redeemable value such that the redeemable value can be set by the shopper assistance server 40 without displaying the redeemable value to the shopper. Upon movement of the shopper, the shopper assistance server 40 may cooperate with the mobile wireless communications device 30 to display the redeemable value on the user interface 37. Operations end at Block 94.

Figure 12A:
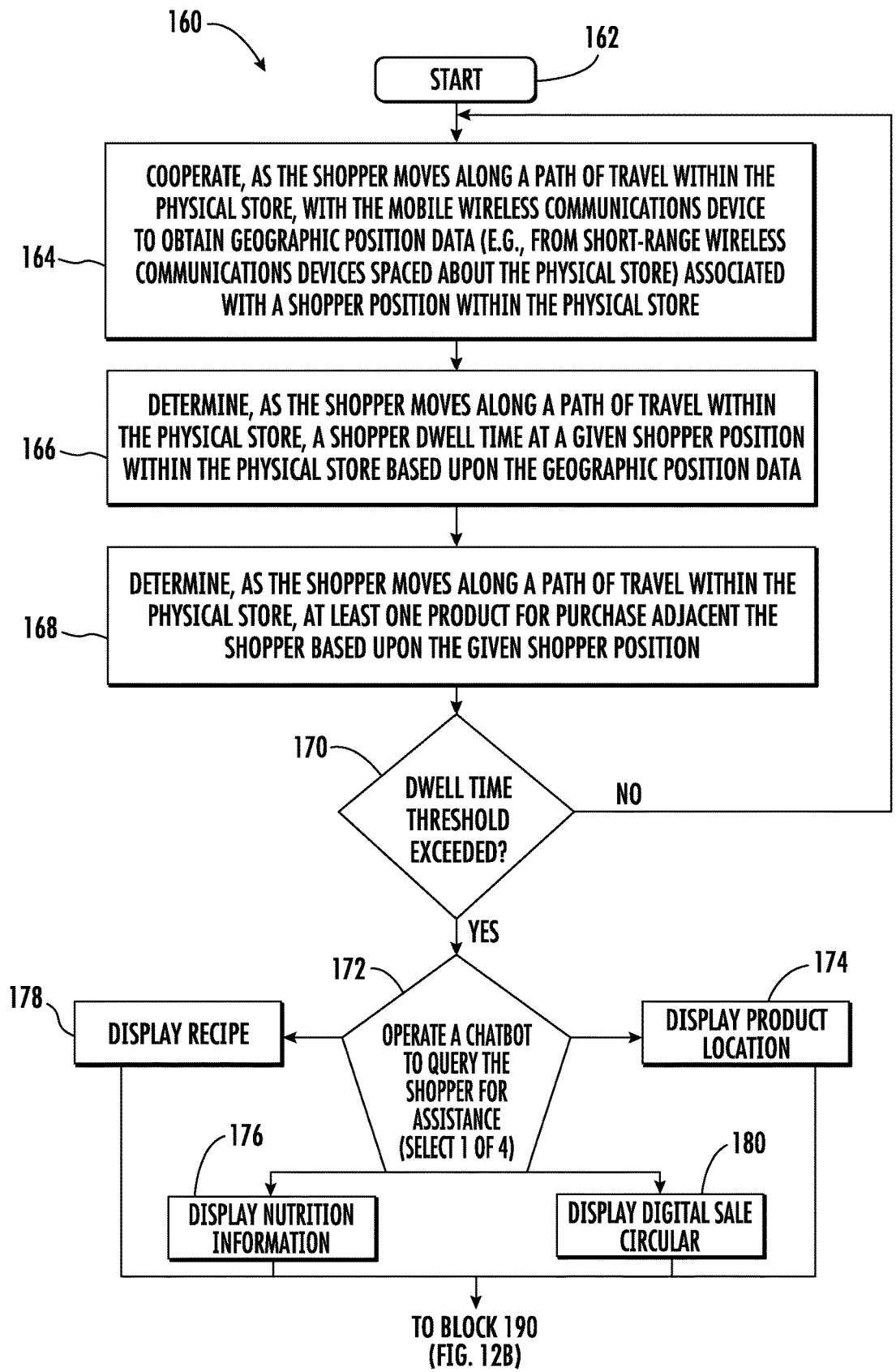
FIGS. 12a and 12b are flow charts illustrating operation of the shopper assistance server of the shopper assistance system of FIG. 6.
Figure 12B:
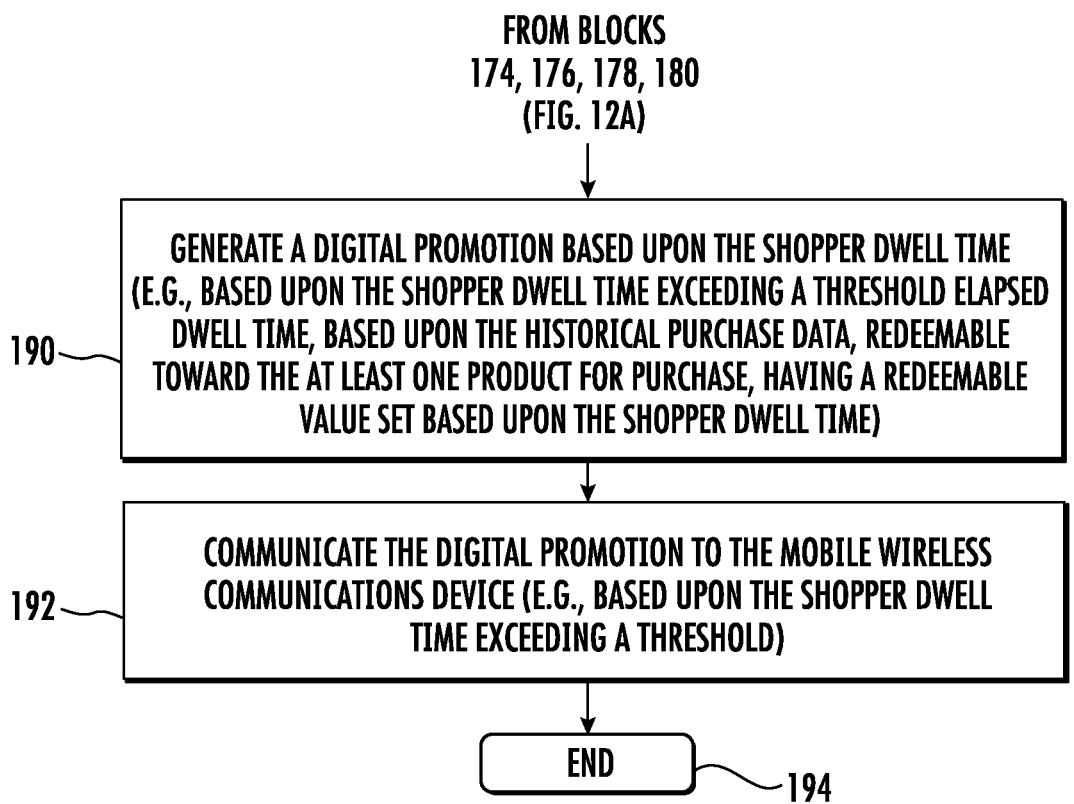

Referring now to FIGS. 6-11 and the flowchart 160 in FIGS. 12a and 12b, beginning at Block 162, operations of the shopper assistance server 40' according to another embodiment will now be described, particularly with respect to the user interface 37'. At Block 170, the shopper assistance server 40' determines whether the shopper dwell time 26' exceeds a dwell time threshold, for example, indicative that the shopper is standing stationary in front of products for purchase 27' along the path of travel. If at Block 170, the shopper dwell time 26' exceeds the dwell time threshold, the shopper assistance server 40' cooperates with the mobile wireless communications device 30' to provide the user interface 37' for providing shopper assistance. More particularly, in the present embodiment, the shopper assistance server 40', via the user interface 37' operates a chatbot 44' to query the shopper as to whether they would like any help (Block 172). The chatbot 44' may prompt the shopper to select whether the shopper cannot locate products for purchase 45', the shopper would like nutritional information 46' (e.g., supplemental nutrition assistance program) associated with one or more products for purchase, or the shopper would like a recipe 47' associated with a product for purchase. The shopper assistance server 40' may also cooperate with the mobile wireless communications device 30' to (e.g., in the chatbot conversation), via the user interface 37' prompt the shopper to select viewing or display of a digital sale circular 48', notify of out of stock or expired products 49', and/or order an item 39' (e.g., an out of stock item). The retailer application 38' may also include inputs 58a' 58b' corresponding to display of the digital sale circular and the shopper's account information, which may display clipped coupons, for example, saved to the shopper's account. The inputs 58a', 58b' may conceptually be considered always-on inputs, for example.

If the shopper selects or provides input corresponding to the chatbot 44' requesting assistance locating a product for purchase 27' (selection 45') (FIG. 8), the chatbot 44' may request input as to what product for purchase that shopper cannot find. The chatbot 44' may display an image 51' of the products for purchase with a visual indicator 52' adjacent the requested product for purchase 27' (Block 174). In an embodiment, an augmented reality (AR) view of the display or shelf where the shopper is standing or dwelling may be displayed with an indicator highlighting where in the field of view the desired product for purchase 27' is located.

If, at Block 172 the shopper selects, via the chatbot 44', nutritional information regarding a product for purchase 27' (FIG. 9) (selection 46'), the chatbot 44' may request input as to what product for purchase that shopper wishes to obtain nutritional information, for example, by providing written input via the chatbot conversation, and the shopper assistance server 40' may provide the desired nutritional information 59' via the chatbot (Block 176). In an embodiment, the shopper may acquire and provide an image from a camera of the mobile wireless communications device 30' within the chatbot 44' of the product for purchase for which nutritional information is desired. In an embodiment, live camera view from a camera of the mobile wireless communications device 30' may be displayed, and the shopper may provide touch input to the display on top of the desired product for which the nutritional information is sought.

If at Block 172, the shopper selects, via the chatbot 44' that the shopper would like a recipe corresponding to a given product for purchase 27' (FIG. 10) (selection 47'), the chatbot 44' may request input as to what product is included in a recipe and display one or more recipes 53' corresponding to the desired product (Block 178). The shopper assistance server 40' may obtain the desired product for purchase 27' for which a recipe is sought based upon an AR view or a live camera view, for example, as described above.

If the shopper, at Block 172, selects viewing of a digital sale circular (selection 48'), the shopper assistance server 40' may display portions of the current digital sale circular 54' corresponding to one or more discounted or "on-sale" products adjacent the shopper (FIG. 11) (Block 180). The pages of the digital circular 54' may be changed as the shopper moves along the path of travel. For example, bakery items featured in the digital sale circular 54' may be displayed via the user interface 37' when the shopper is in the bakery section of the physical store and when the shopper moves to the deli, deli items featured in the digital circular may be displayed.

Of course, some of the above-noted options, for example, display of the digital sale circular 48', may be user-selectable outside of the chatbot conversation such as, for example, within the user interface 37' of the retailer application 38', specifically input 58a'. Moreover, as it relates to the digital sale circular 54', the ability to display the digital sale circular based upon the shopper location may be independent of the shopper dwell time (i.e., available for viewing regardless of whether the shopper dwell time exceeds a dwell time threshold). In an embodiment, the shopper may elect to display the digital sale circular 54' in an "always on" configuration so that the digital sale circular is displayed within the user interface 37' regardless of the inputs or other items displayed in the user interface. Other and/or additional features may be displayed within the user interface 37', for example, a notification or badge, and/or based upon location services.

If, for example, the predetermined shopper responses do not sufficiently address the shopper's query, the shopper may provide input, for example, by speaking or typing, to the chatbot conversation. The shopper assistance server 40' may obtain the provided input, and through operation of the chatbot 44' provide an appropriate response. As will be appreciated by those skilled in the art, the chatbot 44' operates a two-way dialog with the shopper so that the shopper conversation mimics a conversation with another human being.

The shopper assistance server 40' may operate the chatbot 44' to learn common queries and responses for a given shopper position within the physical store 22'. The shopper assistance server 40' may also operate the chatbot 44' to learn the query and response behaviors of other shoppers (e.g., as part of a large language model), for example, when those shoppers are located at the same or nearby shopper position within the physical store.

Operations not specifically described, such as obtaining the geographic position (Block 164), determining the shopper dwell time (Block 166), determining the product for purchase (Block 168), and generating and communicating the digital promotion (Blocks 190 and 192), are similar to those operations described above in Blocks 64, 66, 68, 90, and 92, respectively. Operations end at Block 194.

Figure 13:
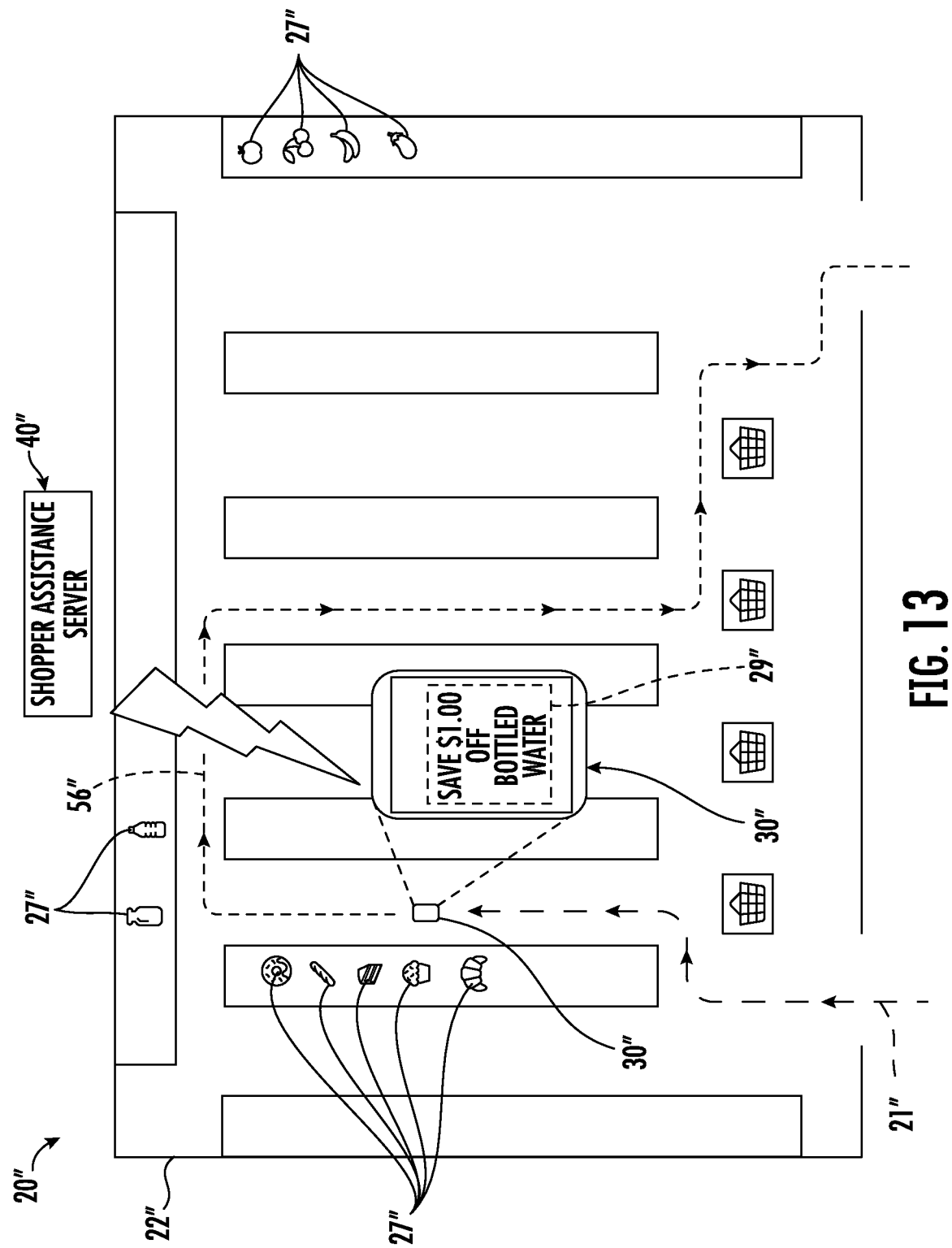
FIG. 13 is a schematic diagram of a shopper assistance system in accordance with another embodiment.
Figure 14:
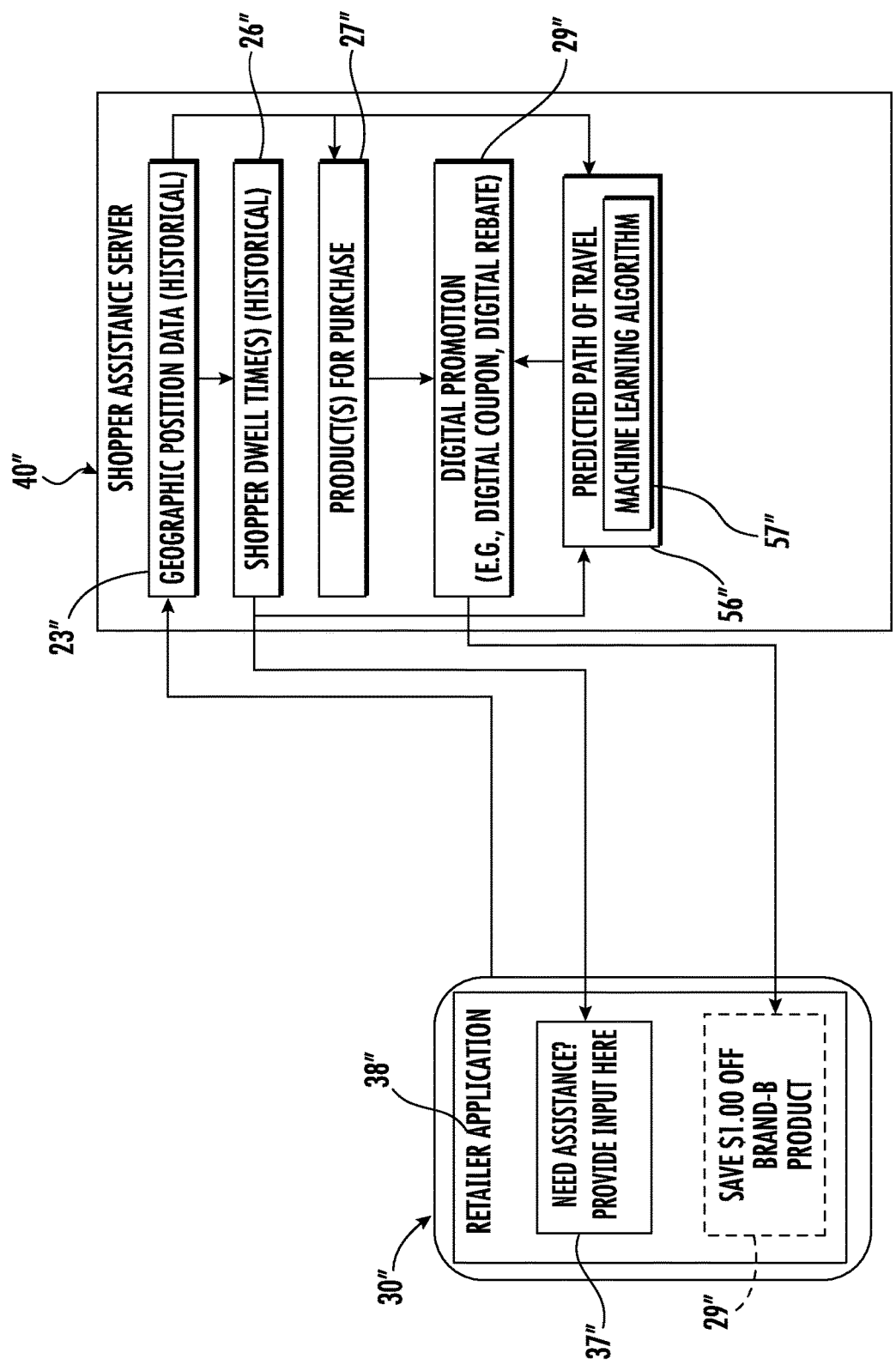
FIG. 14 is a schematic operational block diagram of the shopper assistance system of FIG. 13.
Figure 15A:
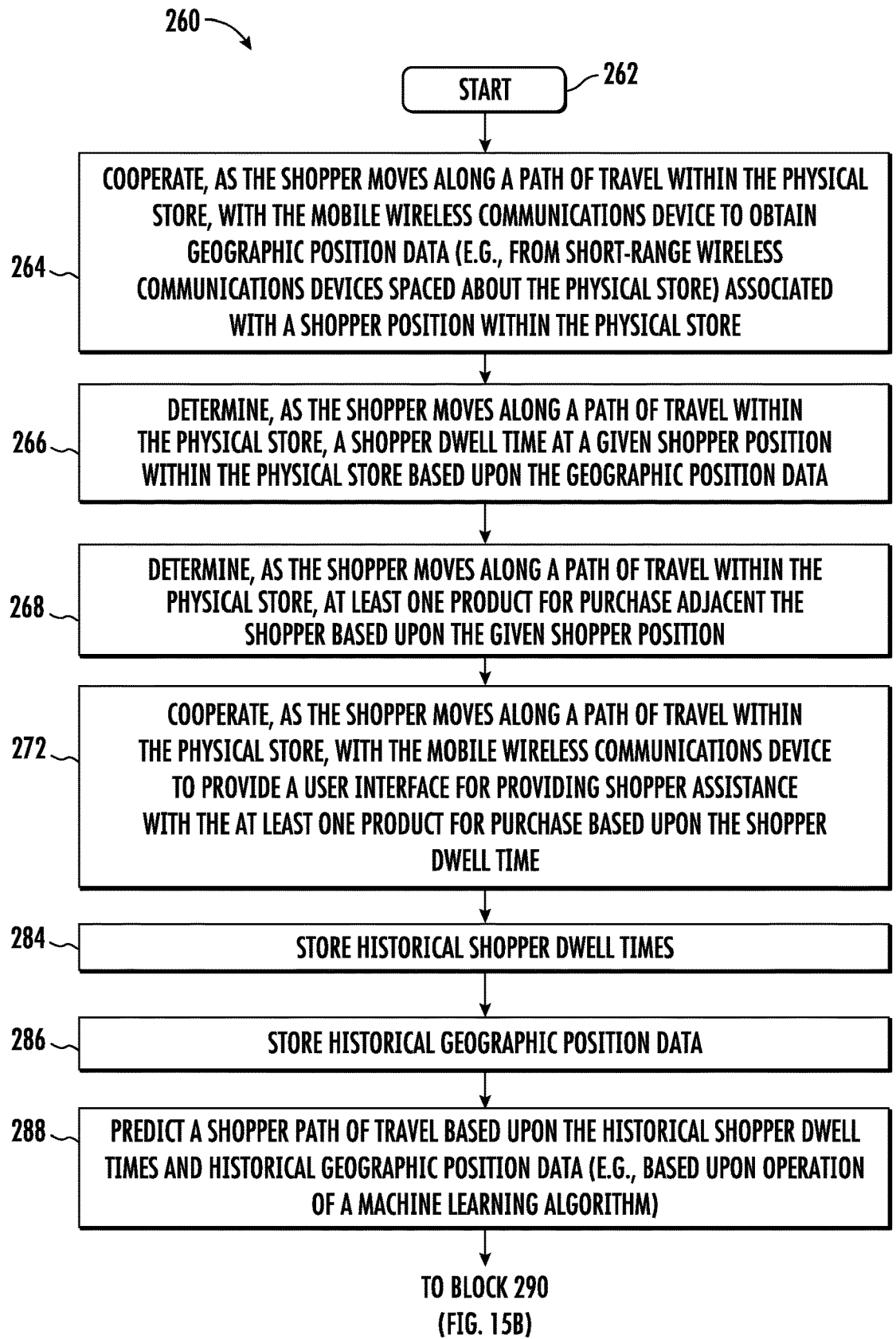
FIGS. 15a and 15b are flow charts illustrating operation of the shopper assistance server of the shopper assistance system of FIG. 13.
Figure 15B:
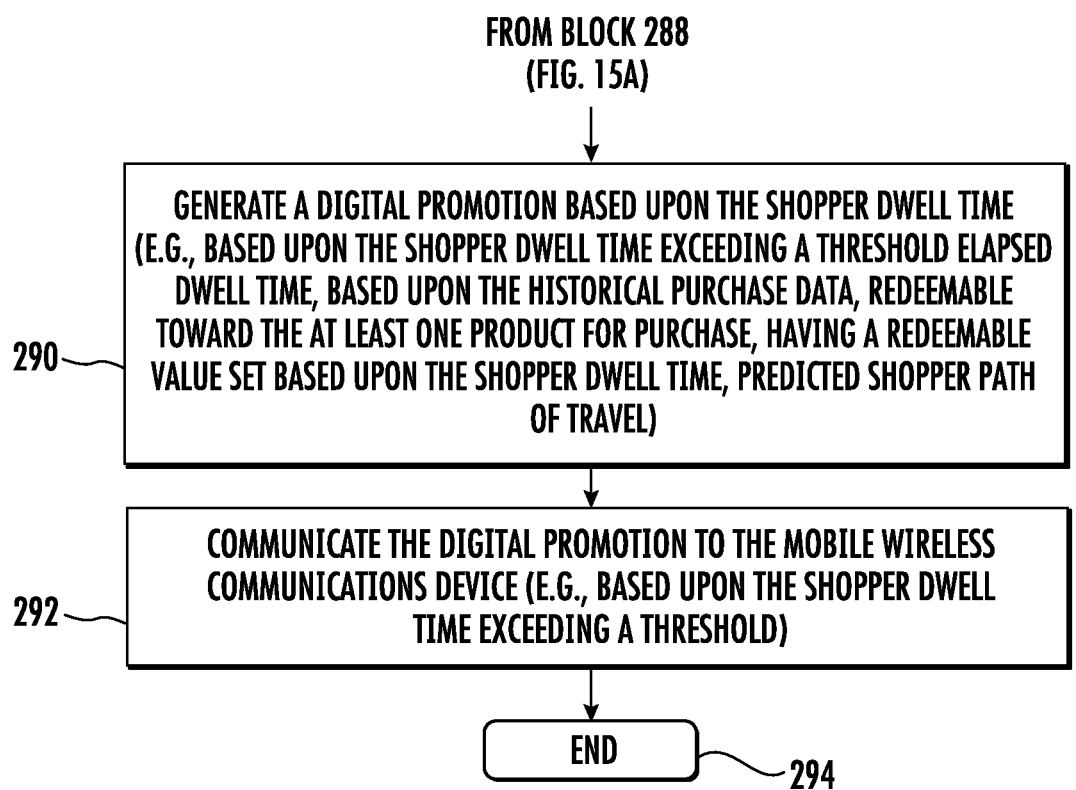

Referring now to FIGS. 13-14, and the flowchart 260 in FIGS. 15a and 15b, operations of the shopper assistance server 40" according to another embodiment will now be described with respect to learning shopper behavior. Beginning at Block 262, the shopper assistance server 40" stores historical shopper dwell times 26" (Block 284). The shopper dwell times 26" may be stored along with corresponding dates, times, shopper identifiers (e.g., loyalty account identifiers). The shopper assistance server 40" may store the historical shopper dwell times 26" for actual dwell times or for certain dwell times, for example, exceeding a threshold. The shopper assistance server 40" may store shopper dwell times 26" as the shopper moves along the path of travel 21" within the physical store 22' '. The shopper assistance server 40" may execute a large language model, for example, that studies and defines optimal location based product data. Loyalty shopper information may be applied to provide real-time geographic data across a store network, for example, to identify an optimal foot-traffic flow for use with purchase data, as will be appreciated by those skilled in the art. Product placement within a given store may be determined, for example.

At Block 286, the shopper assistance server 40" stores historical geographic position data 23" associated with the shopper. More particularly, the shopper location within the physical store may be stored, for example, and correlated to the shopper dwell times 26" so that the historical shopper dwell times are stored with the corresponding geographic position data.

The shopper assistance server 40", at Block 288, predicts a shopper path of travel 56" within the physical store 22" based upon the stored historical shopper dwell times 26" and historical geographic position data 23". The shopper assistance server 40" operates a machine learning algorithm 57" to predict the shopper path of travel 56". The machine learning algorithm 57" may accept as input thereto the stored historical geographic position data 23" and shopper dwell times 26" (e.g., for the given shopper and/or other shoppers). The machine learning algorithm 57" may also accept as input thereto product purchase history of the given shopper and/or other shoppers. The shopper assistance server 40" may operate a prediction model on this data to generate the predicted shopper path of travel 56". The predicted shopper path of travel 56" may be output from the machine learning algorithm 57". The shopper assistance server 40" may generate the digital promotion 29" based upon the predicted shopper path of travel 56' '. More particularly, the shopper assistance server 40", may generate the digital promotion 29" for a product for purchase 27" that the shopper is predicted to pass and for which there is an associated dwell time. In an example, the given shopper may prefer a Brand-A product and typically has a relatively large shopper dwell time near the Brand-A products. The shopper assistance server 40" may thus generate the digital promotion 29" for a Brand-B product (e.g., competitor product), which is next to the Brand-A products on the shelf with the learned expectation that since the shopper spends time adjacent the Brand-A products, they may be more inclined to purchase a Brand-B product. The predicted path of travel 56" may be used to determine placement of products, for example, along with non-dwell times.

Operations not specifically described, such as obtaining the geographic position (Block 264), determining the shopper dwell time (Block 266), determining the products for purchase 27" (Block 268), cooperating with the mobile wireless communications device 30" to provide the user interface 37" (e.g., via the retailer application 38" (Block 272), and generating and communicating the digital promotion 29" (Blocks 290 and 292), are similar to those operations described above in Blocks 64, 66, 68, 72, 90 and 92, respectively. Operations end at Block 294.

As will be appreciated by those skilled in the art, the shopper assistance system 20 may provide relatively valuable insights for retailers and manufacturers. More particularly, by using shopper dwell times 26 as a basis for operations, bottlenecks in physical store layouts, deficiencies in signage and product stocking, and deficiencies in the products (e.g., out of stock, expired, damaged) for purchase themselves may be identified. Alternatively, or additionally, higher shelf space values may be identified for products adjacent shopper having higher shopper dwell times, for example. Thus, promotions may be targeted with the possibility for a higher return or action upon the promotion.

A method aspect is directed to a method of assisting a shopper. The method includes using a shopper assistance server 40 to, as a shopper moves along a path of travel 21 within a physical store 22, as the shopper moves along the path of travel within the physical store, cooperate with a mobile wireless communications device 30 associated with the shopper to obtain geographic position data 23 associated with a shopper position within the physical store, and determine a shopper dwell time 26 at a given shopper position within the physical store based upon the geographic position data. The method also includes using the shopper assistance server 40 to, as the shopper moves along the path of travel 21 within the physical store 22, determine at least one product for purchase 27 adjacent the shopper based upon the given shopper position, and cooperate with the mobile wireless communications device 30 to provide a user interface 37 for providing shopper assistance with the at least one product for purchase based upon the given shopper dwell time 26. The method further includes using the shopper assistance server 40 to, as the shopper moves along the path of travel 21 within the physical store 22, generate and communicate to the mobile wireless communications device 30 a digital promotion 29 based upon the shopper dwell time 26.

A computer readable medium aspect is directed to a non-transitory computer readable medium that includes computer executable instructions that when executed by a processor 41 cause the processor to perform operations. The operations include, as a shopper moves along a path of travel 21 within a physical store 22, cooperating with a mobile wireless communications device 30 associated with the shopper to obtain geographic position data 23 associated with a shopper position within the physical store 22 and determining a shopper dwell time 26 at a given shopper position within the physical store based upon the geographic position data. The operations also include, as the shopper moves along the path of travel 21 within the physical store 22, determining at least one product for purchase 27 adjacent the shopper based upon the given shopper position and cooperating with the mobile wireless communications device 30 to provide a user interface 37 for providing shopper assistance with the at least one product for purchase based upon the given shopper dwell time 26. The operations further include, as the shopper moves along the path of travel 21 within the physical store 22, generating and communicating to the mobile wireless communications device 30 a digital promotion 29 based upon the shopper dwell time.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A shopper assistance system comprising:
a mobile wireless communications device associated with a shopper and comprising first-range wireless communications circuitry and second-range wireless communications circuitry having a communications range less than the first-range wireless communications circuitry; and
a shopper assistance server configured to store a plurality of historical shopper dwell times,
store historical geographic position data associated with the shopper, and
as the shopper moves along a path of travel within a physical store,
cooperate with the mobile wireless communications device to obtain geographic position data associated with a shopper position within the physical store based upon the first-range wireless communications circuitry,
cooperate with the mobile wireless communications device to obtain the geographic position data associated with the shopper position within the physical store based upon the second-range wireless communications circuitry upon a degradation in communications via the first-range wireless communications circuitry,
determine a shopper dwell time at a given shopper position within the physical store based upon the geographic position data,
determine at least one product for purchase adjacent the shopper based upon the given shopper position,
cooperate with the mobile wireless communications device to provide a user interface for providing shopper assistance with the at least one product for purchase based upon the shopper dwell time,
predict a shopper path of travel based upon the plurality of historical shopper dwell times and historical geographic position data, and
generate and communicate to the mobile wireless communications device a digital promotion based upon the shopper dwell time and the predicted shopper path of travel.

2. The shopper assistance system of claim 1 wherein the shopper assistance server is configured to operate a chatbot via the user interface based upon the shopper dwell time.

3. The shopper assistance system of claim 2 wherein the shopper assistance server is configured to operate the chatbot to prompt the shopper to select one of whether the shopper cannot locate the at least one product for purchase, the shopper would like nutrition information associated with the at least one product for purchase, and the shopper would like a recipe associated with the at least one product for purchase.

4. The shopper assistance system of claim 1 wherein the shopper assistance server is configured to generate and communicate the digital promotion to the shopper based upon the shopper dwell time exceeding a threshold elapsed dwell time.

5. The shopper assistance system of claim 1 wherein the at least one product for purchase comprises a plurality of products for purchase; and wherein the shopper assistance server is configured to, via the user interface, display a portion of a digital sale circular corresponding to at least one discounted product for purchase from among the plurality of products for purchase adjacent the shopper.

6. The shopper assistance system of claim 1 further comprising a plurality of short-range wireless communications devices spaced about the physical store; wherein the second-range wireless communications circuitry comprises short-range wireless communications circuitry; and wherein the shopper assistance server is configured to obtain geographic position data based upon communication with the plurality of short-range wireless communications devices and the short-range wireless communications circuitry.

7. The shopper assistance system of claim 1 wherein the shopper assistance server is configured to operate a machine learning algorithm to predict the shopper path of travel.

8. The shopper assistance system of claim 1 wherein the shopper assistance server is configured to generate the digital promotion to be redeemable toward the at least one product for purchase adjacent the shopper.

9. The shopper assistance system of claim 8 wherein the digital promotion has a redeemable value associated therewith; and wherein the shopper assistance server is configured to set the redeemable value based upon the shopper dwell time.

10. The shopper assistance system of claim 1 wherein the shopper assistance server is configured to store historical product purchase data for the shopper and generate the digital promotion based upon the historical product purchase data.

11. The shopper assistance system of claim 1 wherein the first-range wireless communications circuitry comprises at least one of cellular wireless communications circuitry and global positioning system (GPS) wireless communications circuitry.

12. The shopper assistance system of claim 1 wherein the second-range wireless communications circuitry comprises at least one of Wi-Fi wireless communications circuitry and Bluetooth wireless communications circuitry.

13. A shopper assistance server comprising:
a processor and an associated memory configured to
store a plurality of historical shopper dwell times,
store historical geographic position data associated with a shopper, and
as the shopper moves along a path of travel within a physical store,
cooperate with a mobile wireless communications device associated with the shopper to obtain geographic position data associated with a shopper position within the physical store based upon first-range wireless communications circuitry of the mobile wireless communications device,
cooperate with the mobile wireless communications device to obtain the geographic position data associated with the shopper position within the physical store based upon second-range wireless communications circuitry of the mobile wireless communications device upon a degradation in communications via the first-range wireless communications circuitry, the second-range wireless communications circuitry having a communications range less than the first-range wireless communications circuitry,
determine a shopper dwell time at a given shopper position within the physical store based upon the geographic position data,
determine at least one product for purchase adjacent the shopper based upon the given shopper position,
cooperate with the mobile wireless communications device to provide a user interface for providing shopper assistance with the at least one product for purchase based upon the shopper dwell time,
predict a shopper path of travel based upon the plurality of historical shopper dwell times and historical geographic position data, and
generate and communicate to the mobile wireless communications device a digital promotion based upon the shopper dwell time and the predicted shopper path of travel.

14. The shopper assistance server of claim 13 wherein the processor is configured to operate a chatbot via the user interface based upon the shopper dwell time.

15. The shopper assistance server of claim 14 wherein the processor is configured to operate the chatbot to prompt the shopper to select one of whether the shopper cannot locate the at least one product for purchase, the shopper would like nutrition information associated with the at least one product for purchase, and the shopper would like a recipe associated with the at least one product for purchase.

16. The shopper assistance server of claim 13 wherein the processor is configured to generate and communicate the digital promotion to the shopper based upon the shopper dwell time exceeding a threshold elapsed dwell time.

17. The shopper assistance server of claim 13 wherein the at least one product for purchase comprises a plurality of products for purchase; and wherein the processor is configured to, via the user interface, display a portion of a digital sale circular corresponding to at least one discounted product for purchase from among the plurality of products for purchase adjacent the shopper.

18. The shopper assistance server of claim 13 wherein the second-range wireless communications circuitry comprises short-range wireless communications circuitry; and wherein the processor is configured to obtain geographic position data based upon communication with a plurality of short-range wireless communications devices spaced about the physical store and the short-range wireless communications circuitry.

19. The shopper assistance server of claim 13 wherein the first-range wireless communications circuitry comprises at least one of cellular wireless communications circuitry and global positioning system (GPS) wireless communications circuitry; and wherein the second-range wireless communications circuitry comprises at least one of Wi-Fi wireless communications circuitry and Bluetooth wireless communications circuitry.

20. A method of assisting a shopper comprising:
using a shopper assistance server to
store a plurality of historical shopper dwell times,
store historical geographic position data associated with a shopper, and
as the shopper moves along a path of travel within a physical store,
cooperate with a mobile wireless communications device associated with the shopper to obtain geographic position data associated with a shopper position within the physical store based upon first-range wireless communications circuitry of the mobile wireless communications device,
cooperate with the mobile wireless communications device to obtain the geographic position data associated with the shopper position within the physical store based upon second-range wireless communications circuitry of the mobile wireless communications device upon a degradation in communications via the first-range wireless communications circuitry, the second-range wireless communications circuitry having a communications range less than the first-range wireless communications circuitry, determine a shopper dwell time at a given shopper position within the physical store based upon the geographic position data, determine at least one product for purchase adjacent the shopper based upon the given shopper position, cooperate with the mobile wireless communications device to provide a user interface for providing shopper assistance with the at least one product for purchase based upon the shopper dwell time, predict a shopper path of travel based upon the plurality of historical shopper dwell times and historical geographic position data, and generate and communicate to the mobile wireless communications device a digital promotion based upon the shopper dwell time and the predicted shopper path of travel.

21. The method of claim 20 wherein using the shopper assistance server comprises using the shopper assistance server to operate a chatbot via the user interface based upon the shopper dwell time.

22. The method of claim 20 wherein using the shopper assistance server comprises using the shopper assistance server to generate and communicate the digital promotion to the shopper based upon the shopper dwell time exceeding a threshold elapsed dwell time.

23. The method of claim 20 wherein the second-range wireless communications circuitry comprises short-range wireless communications circuitry; and wherein using the shopper assistance server comprises using the shopper assistance server to obtain geographic position data based upon communications with a plurality of short-range wireless communications devices spaced about the physical store and the short-range wireless communications circuitry.

24. The method of claim 20 wherein the first-range wireless communications circuitry comprises at least one of cellular wireless communications circuitry and global positioning system (GPS) wireless communications circuitry; and wherein the second-range wireless communications circuitry comprises at least one of Wi-Fi wireless communications circuitry and Bluetooth wireless communications circuitry.

25. A non-transitory computer readable medium comprising computer executable instructions that when executed by a processor cause the processor to perform operations comprising:

storing a plurality of historical shopper dwell times;

storing historical geographic position data associated with a shopper; and as the shopper moves along a path of travel within a physical store cooperating with a mobile wireless communications device associated with the shopper to obtain geographic position data associated with a shopper position within the physical store based upon first-range wireless communications circuitry of the mobile wireless communications device, cooperating with the mobile wireless communications device to obtain the geographic position data associated with the shopper position within the physical store based upon second-range wireless communications circuitry of the mobile wireless communications device upon a degradation in communications via the first-range wireless communications circuitry, the second-range wireless communications circuitry having a communications range less than the first-range wireless communications circuitry, determining a shopper dwell time at a given shopper position within the physical store based upon the geographic position data, determining at least one product for purchase adjacent the shopper based upon the given shopper position;

cooperating with the mobile wireless communications device to provide a user interface for providing shopper assistance with the at least one product for purchase based upon the shopper dwell time, predicting a shopper path of travel based upon the plurality of historical shopper dwell times and historical geographic position data, and generating and communicating to the mobile wireless communications device a digital promotion based upon the shopper dwell time and the predicted shopper path of travel.

26. The non-transitory computer readable medium of claim 25 wherein the operations comprise using the shopper assistance server to operate a chatbot via the user interface based upon the shopper dwell time.

27. The non-transitory computer readable medium of claim 25 wherein the operations comprise generating and communicating the digital promotion to the shopper based upon the shopper dwell time exceeding a threshold elapsed dwell time.

28. The non-transitory computer readable medium of claim 25 wherein the second-range wireless communications circuitry comprises short-range wireless communications circuitry; and wherein the operations comprise obtaining geographic position data based upon communications with a plurality of short-range wireless communications devices spaced about the physical store and the short-range wireless communications circuitry.

29. The non-transitory computer readable medium of claim 25 wherein the first-range wireless communications circuitry comprises at least one of cellular wireless communications circuitry and global positioning system (GPS) wireless communications circuitry; and wherein the second-range wireless communications circuitry comprises at least one of Wi-Fi wireless communications circuitry and Bluetooth wireless communications circuitry.

\* \* \* \* \*